April 17, 1962  R. J. KOPF ETAL  3,029,435
POWDER-ACTUATED TOOL
Filed April 15, 1955  4 Sheets-Sheet 1

INVENTORS
Rowland J. Kopf
Robert W. Henning
Roger Marsh
BY Hyde, Meyer, Baldwin & Doran
ATTORNEYS April 17, 1962 R. J. KOPF ETAL 3,029,435
POWDER-ACTUATED TOOL
Filed April 15, 1955 4 Sheets-Sheet 2

INVENTORS
Rowland J. Kopf
Robert W. Henning
Roger Marsh
BY
Hyde, Meyer, Baldwin & Doran
ATTORNEYS

INVENTORS
Rowland J. Kopf
Robert W. Henning
Roger Marsh
BY
Hyde, Meyer, Baldwin & Doran
ATTORNEYS

April 17, 1962  R. J. KOPF ETAL  3,029,435
POWDER-ACTUATED TOOL
Filed April 15, 1955  4 Sheets-Sheet 4

INVENTORS
Rowland J. Kopf
Robert W. Henning
Roger Marsh
BY
Hyde, Meyer, Baldwin & Doran
ATTORNEYS

United States Patent Office 3,029,435
Patented Apr. 17, 1962

3,029,435
POWER-ACTUATED TOOL
Rowland J. Kopf and Robert W. Henning, Rocky River, and Roger Marsh, Hudson, Ohio, assignors, by mesne assignments, to Olin Mathieson Chemical Corporation, a corporation of Virginia
Filed Apr. 15, 1955, Ser. No. 501,534
26 Claims. (Cl. 1—44.5)

This invention relates to improvements in power-actuated tools.

One of the objects of the present invention is to provide a power-actuated tool for driving the piercing portions of fasteners into workpieces with said tool having one or more of the following features: (1) a carrier for said piercing portion surrounding the tool barrel and movable over it instead of located within the barrel bore and movable through it so that the fastener may be chosen of the proper size, weight and form preferred for the specific project at hand; (2) means to restrain the piercing portion of the fastener against free flight to prevent over-penetration of the workpiece, ricochet therefrom, or "air firing" of the tool; (3) means for stopping the piercing portion after it has traveled sufficiently far for proper depth penetration and then for permitting axial withdrawal of the tool from the driven fastener; (4) driving means for the piercing portion for driving said portion at a fairly low speed but capable of driving the piercing portion to a satisfactory depth in the workpiece; (5) without breach locking means of a mechanical nature; (6) constructed so that an extremely short barrel will still provide adequate drive; (7) fluid pressure actuated with a large effective pressure driving area to provide greater driving force at slower speeds and lower operational pressures to provide greater operational safety; (8) manually controllable means for initiating power driving of the fastener; (9) a controllable element in said initiating means engageable with the workpiece to provide safety features for said tool; (10) a solid-type tool frame including rigidly connected together a tool hand grip, a manually controllable means for initiating driving of the fastener, a closure element for the tool bore, a passageway for confining and driving the piercing portion of the fastener, a stop means for limiting the forward movement of the piercing portion, and/or a workpiece engageable portion of the tool; (11) detachable lock means for detachably securing fastener guiding and driving means in the tool frame; (12) manually engageable means for forcing fluid pressure to eject the spent cartridge case from a tool wherein explosive power supplies power actuation; (13) means for adjusting the penetration depth of the piercing portion of the fastener by adjustment of its position in its carrier; (14) means for adjusting the driving energy of the piercing portion; (15) ease of assembly and disassembly of the component parts with a portion of a manually controllable means for initiating power driving of the fastener detachably holding the fastener guiding and driving means in assembled position; and/or (16) many other desirable features.

A further object of the present invention is to provide a power-actuated tool characterized by its greater safety in operation, structural simplicity, more satisfactory driving of fasteners thereby, ease of operation, and more efficient operation by its component parts.

Other features of this invention reside in the arrangement and design of the parts for carrying out their appropriate functions. Other objects and advantages of this invention will be apparent from the accompanying drawings and description and the essential features will be set forth in the appended claims.

In the drawings:

FIG. 12 is a longitudinal cross sectional view of only the carrier and fastener in FIG. 4 with the tool partially removed axially from the driven fastener; while

Before the tool here illustrated is specifically described, it is to be understood that the invention here involved is not limited to the structural details or arrangement of parts here shown since tools embodying the present invention may take various forms. It also is to be understood that the phraseology or terminology herein employed is for the purposes of description and not of limitation and the scope of the present invention is denoted by the appended claims.

Those familiar with this art will recognize that this invention may be applied in many ways. The explosively actuated tool embodiment is described herein but many features thereof may be used on tools with other type power actuation. The illustrated tool is adapted to drive or set the piercing portions of fasteners into workpieces with the term "fastener" intending to cover pins, studs, pins with threaded heads, etc. and other objects of the type adapted to be driven into a workpiece by a tool.

Figures 1, 6:
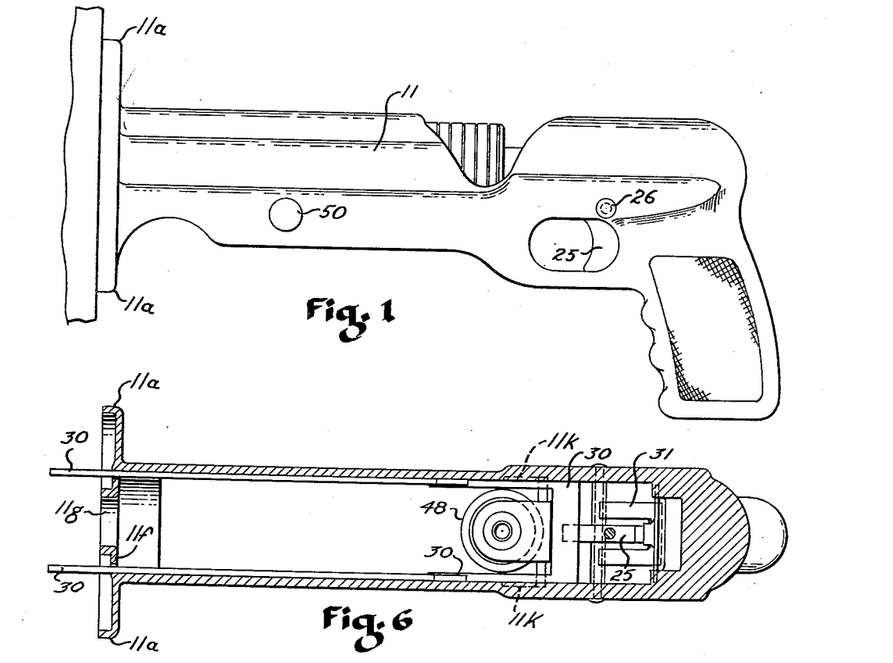
FIG. 1 is a side elevational view of the tool in ready-to-fire position against the surface of a workpiece adapted to receive the piercing portion of a fastener driven thereby.
FIG. 6 is a longitudinal sectional view taken along the line 6—6 of FIG. 5.
Figure 2:
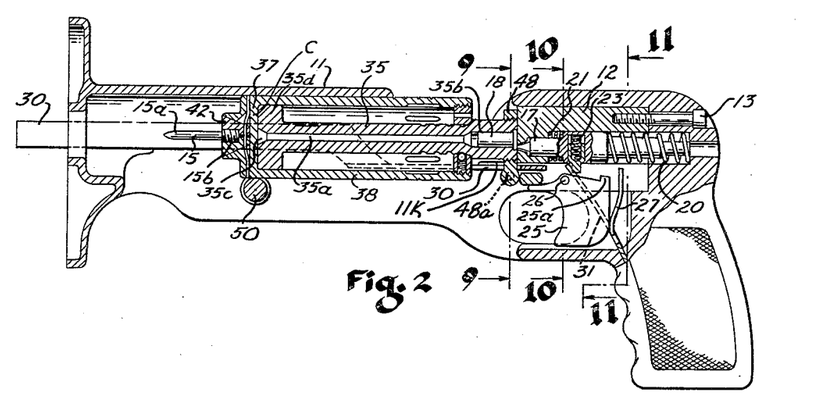
FIG. 2 is a longitudinal sectional view of FIG. 1 with the tool in its closed position for driving but with the driving or firing initiating means in its safety position.

The tool is of the solid-frame type with its frame including a frame member 11 in FIGS. 1 and 2 integrally formed with many component parts of the tool and including the other component parts of the tool rigidly connected therewith or operatively carried thereby. The frame includes a block 12 in FIG. 2 secured to frame member 11 in FIG. 2 by bolt 13 with this block serving as an inlet end or cartridge chamber closure element and as the front of the firing means.

Figure 3:
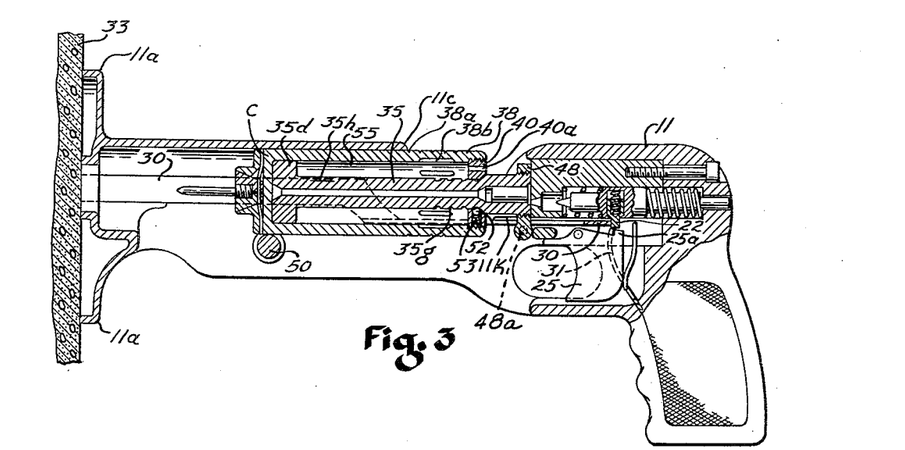
FIG. 3 is a longitudinal sectional view, similar to FIG. 2, but with the tool in its closed position for driving and with its power initiating means in its ready-to-fire position with the tool pressed against the workpiece.

Manually controllable firing means is provided for initiating power driving of the fastener by the tool responsive to operator controlled movement of a firing pin type actuator from a safety to a driving position. The specific fastener 15 illustrated in FIG. 2 includes a pointed, workpiece piercing portion 15a integrally connected to an enlarged, threaded head 15b. This fastener is driven by the tool after firing pin 17 explodes the powder in cartridge case 18. Firing pin 17 in FIG. 2 is normally urged toward the firing or driving position by firing pin spring 20 but is normally kept out of contact with the cartridge case 18 by firing pin rebound spring 21 unless the force of the latter is overcome by the inertia of the firing pin when moving toward the cartridge case under the bias of spring 20. Firing pin 17 carries a reciprocatable firing pin pawl 22 normally biased outwardly by firing pin pawl spring 23 to the position shown in FIGS. 2, 3 and 5 and capable of being moved inwardly by trigger sear 25a on trigger 25 to the position shown in FIG. 4 when the trigger sear and pawl are aligned, as shown in FIG. 3, and trigger 25 is pulled. Trigger 25, serving as a manual operating means for initiating the driving of the fastener, is pivotally mounted by pin 26 to frame member 11 and is normally biased to the position shown in FIGS. 2, 3 and 5 by trigger spring 27, secured by its upper end in a slot in frame member 11, unless pulled by the operator to the FIG. 4 position for initiating driving of the fastener. A cocking slide or element 30, herein shown as separate from the barrel of the tool, has laterally spaced apart arms engageable with the workpiece in the zone of fastener penetration during fastener driving with the arms connected together by a cross member engageable with the outwardly extending portion of firing pin pawl 22 in FIG. 3. The generally U-shape of this element 30 is more clearly shown in FIG. 6. This element or cocking slide 30 is mounted in frame member 11 to permit relative movement between these parts along a generally horizontal line (generally lengthwise of element 30) in the direction of fastener driving travel. A resilient means, here illustrated as leaf spring 31 (FIG. 6), serves as a cocking slide return spring having its lower end in FIG. 2 secured in a notch in frame member 11 and having its upper end in FIGS. 3 and 4 operatively engageable with the cross member of cocking slide 30 for resiliently urging the latter back toward the FIG. 2 or safety position with the muzzle end of element 30 projecting beyond flush relationship with flange 11a. Element 30 is free to travel forwardly beyond spring 31 to the FIG. 2 position, if so desired.

Figure 4:
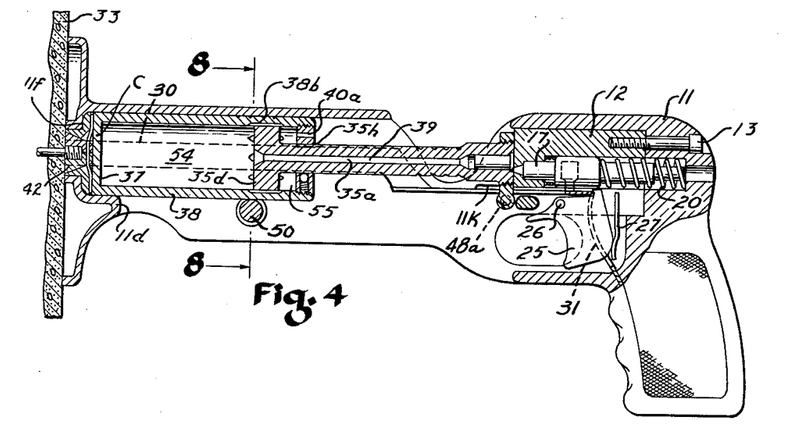
FIG. 4 is a longitudinal sectional view of the tool in its closed and driven position with the piercing portion of the fastener driven into the workpiece to the predetermined depth.

In normal operation, the tool is actuatable from a safety position in FIG. 2 to a ready-to-fire or cocked position in FIG. 3, to a firing or driving position, and then to a fastener driven position in FIG. 4. Firing pin 17 is correspondingly moved in the first three positions from a safety position to a ready-to-fire position and then to a firing position for igniting the charge in cartridge case 18. As the tool is pressed against the workpiece 33 in FIG. 3, cocking slide or element 30 is engageable with workpiece 33, and then frame member 11 telescopes thereover carrying with it, the firing pin 17. With the cocking slide 30 engaging the workpiece and the tool moving from its FIG. 2 to its FIG. 3 position, said slide is so disposed as to engage with the trigger pawl 22 to thereby arrest the forward movement of the firing pin 17 and hence compress the firing pin spring 20. As a result, said pin is cocked and disposed in a ready-to-fire position as viewed in FIG. 3. This is accomplished by having the cross member of element 30 engageable with the firing pin pawl 22 so as to compress firing pin spring 20 and to align pawl 22 with trigger sear 25a in the cocked or ready-to-fire position in FIG. 3.

Since it is desirable to drive the piercing portion 15a of the fastener into the workpiece 33 approximately normal to the top surface thereof, a suitable tilt control is inherent in this construction. Frame member 11 has a portion 11a laterally projecting away from the laterally aligned arms of element 30 to form a flange-like portion 11a with its left edge in FIG. 2 being continuous and lying in a plane transverse to the direction of fastener travel so as to be engageable with the workpiece 33 so that any tilt of the tool with respect to workpiece 33 will result in the tool frame member 11 and cocking slide 30 assuming a position between that shown in FIGS. 2 and 3 since the arms of slide 30 will project some distance beyond said last mentioned plane under the bias of spring 31. Then, cocking slide 30 will not return firing pin pawl 22 to alignment with trigger sear 25a in the manner shown in FIG. 3 so that this construction will serve as means to prevent movement of the firing pin 21 to the firing position since pawl 22 cannot be depressed by pulling trigger 25. This construction not only provides angle fire control but also normally prevents firing the tool into open air by so-called "air firing," instead of against the workpiece since slide 30 must be depressed to the FIG. 3 position to permit tool firing.

When the tool operator pulls trigger 25 with the tool in the FIG. 3 position, pawl 22 is depressed by trigger sear 25a so that firing pin spring 20 will drive the firing pin forwardly the rest of the way to the firing or driving position against the primer of the cartridge case 18 with sufficient force to overcome firing pin rebound spring 21 and ignite the explosive charge in the cartridge 18.

A fastener guiding and driving means of any suitable type may be used but is shown herein as a fluid pressure actuated cylinder and piston construction for driving the piercing portion 15a of the fastener into workpiece 33 under the driving force provided by the fluid pressure of the expanding gas from the explosive powder charge in cartridge case 18. A member 35 in FIG. 2 has a bore 35a therethrough for conveying the fastener driving explosive fluid pressure from the cartridge case 18 in cartridge chamber 35b at the inlet end thereof to the bore outlet end 35c. Since member 35 provides many of the functions of a tool barrel, it might properly be called a barrel since it has a chamber 35b for the cartridge case and has a through bore 35a for directing the fluid pressure from the explosive charge in the direction of fastener driving travel for driving said fastener along the axis of said bore. An outwardly extending integrally formed flange 35d on the member 35 serves as a piston in the cylinder-piston unit with the fastener carrier C or ram forming the cylinder thereof and mounted slidably over said flange 35d. The carrier C includes a head 37, shown herein as larger than the diameter of bore 35a and of chamber 35b and located outside of the outlet end of this bore, for carrying fastener 15 during driving. Head 37 may be operatively connected to member 35 in any suitable manner for confining the fluid pressure to provide drive thereby for permitting relative movement of the head by power along the axis of bore 35a and with respect to member 35. However, it is shown herein as connected by a sleeve 38 having its lead end closed by integrally formed head 37 and telescopically connected over flange 35d to provide the cylinder of the cylinder-piston unit with the fluid pressure of the explosive charge expandable in chamber 54 in FIG. 4 for driving the fastener with this chamber including bore 35a and the volume enclosed by sleeve 38 between head 37 and flange 35d. A closed rear wall 40 in FIG. 3 may, if desired, be telescopically connected over the periphery of member 35 and threaded into the rear of the bore of sleeve 38. The rear wall 40 and flange 35d slidably support sleeve 38 for guiding the travel of head 37 generally along the axis of bore 35a. Since opposite ends of member 35 are enlarged, assembly of rear wall 40 on the necked down portion therebetween may normally cause an assembly problem, but this assembly problem may be solved by having either wall 40 made in two segments securable together after assembly on member 35 or piston 35d detachably secured on member 35 instead of being formed integral therewith.

Fastener 15 may be of any suitable shape and may be carried in any suitable manner during driving to form more or less of the head and sleeve type fastener carrier. In the present disclosure, it is detachably secured to head 37 by a releasable chuck 42 in FIGS. 2, 4, 12 and 13 of a spring loaded, quickly openable collet design for detachably carrying a fastener 15 by the head 15b during driving but permits detachment from a driven fastener by axially pulling the tool off the driven fastener. The illustrated collet chuck 42 has chuck or collet jaws 43 of segmental form, here shown as four in number, normally biased toward a closed position in FIGS. 2, 3, 4 and 5 but permitted to move to an open position in FIGS. 12 and 13 by two springs 44 extending at right angles to each other through generally aligned holes in jaws 43 and head 37 to bias the conical periphery of jaws 43 into conical bore 37a of head 37. Fastener 15 can be threaded into the threaded bore hole formed by segmental jaws 43 to any desired depth so as to control the protrusion of the fastener from the head 37 and thereby control the depth of fastener penetration in workpiece 33, as will be more evident as the description proceeds. Any other type suitable detachable connection can be provided between head 37 and fastener 15 to accommodate the shape of any desired fastener.

Figure 5:
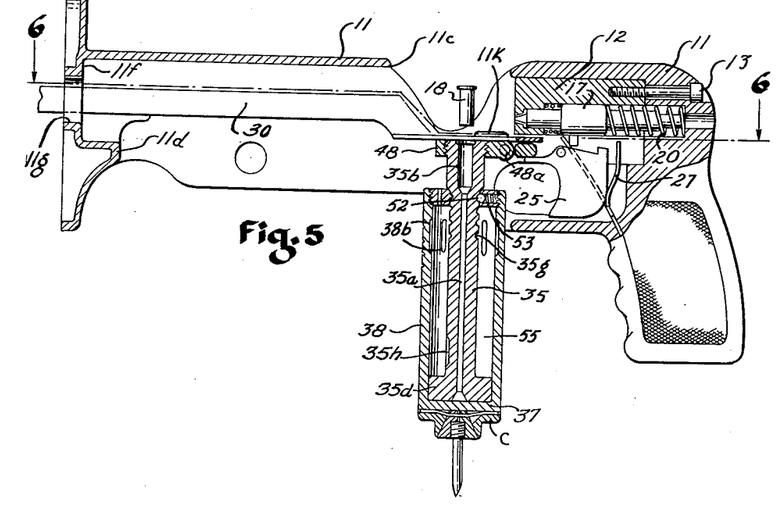
FIG. 5 is a longitudinal sectional view of the tool removed from the workpiece and in its open position for loading.
Figure 7:
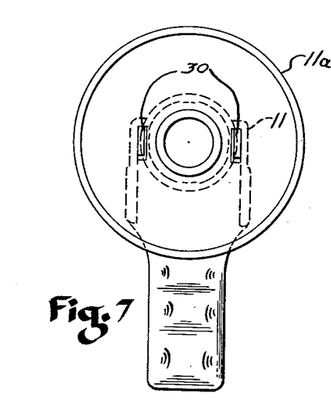
FIG. 7 is a front elevational view of the tool taken from the left-hand side looking toward the right in FIG. 2.
Figure 9:
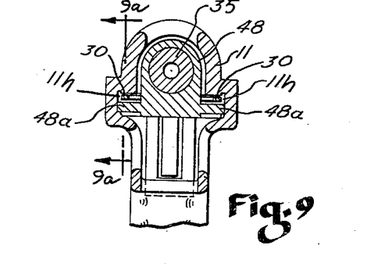
FIGS. 9, 10 and 11 are transverse cross sectional views taken along the lines 9—9, 10—10 and 11—11 respectively of FIG. 2.
Figure 9A:
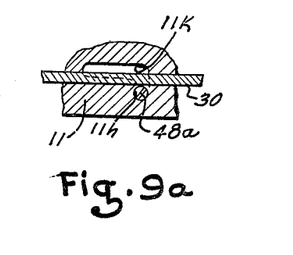
FIG. 9a is sectional view taken on line 9a—9a of FIG. 9.
Figure 10:
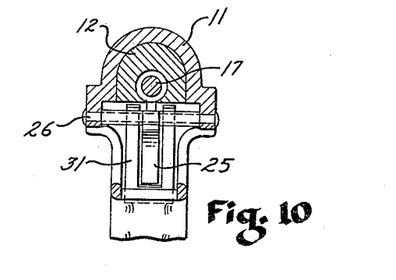
Figure 11:
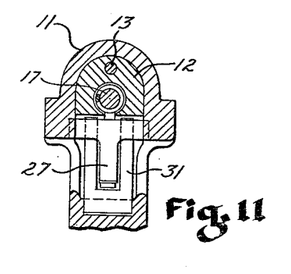

The fastener guiding and driving means is operatively connected to frame member 11 for movement between a first or closed position in FIGS. 2, 3 and 4 for fastener driving and a second or open position in FIG. 5 for loading the tool. In the present tool, the FIG. 5 position is utilized for loading or unloading cartridge cases 18 into cartridge chamber 35b. Member 35 has screwed onto the periphery thereof a ring 48 having outwardly extending pins 48a, 48a in FIG. 9 and FIG. 9a pivotally mounted in inverted L-shaped grooves 11k to frame member 11 to permit said movement. The screwed connection permits adjustment of the abutment of member 35 against closure block 12 to provide proper sealing and tool closing actions. These pivot pins 48a permit pivoting member 35, on an axis located to one side of bore 35a and extending transversely thereto, between the first or closed position in FIG. 4 for closing the cartridge case chamber 35b for fastener driving and an open position in FIG. 5 for uncovering this chamber 35b for ejecting the spent cartridge case therefrom in the manner shown in FIG. 5 or loading a new one therein.

A detachable lock means is provided for detachably locking the driving and guiding means in the closed position for driving shown in FIGS. 2, 3 and 4 while permitting release thereof for movement to the loading position shown in FIG. 5. In the present disclosure, frame member 11 in FIGS. 2, 3 and 8 extends along and surrounds sleeve 38 on three sides thereof with an open bottom through which the fastener guiding and driving means can swing in moving between these positions. A movable cross bolt 50 detachably extends through aligned holes 11b in opposite side walls of this frame member to straddle the open side to permit locking and releasing in the manner described. Cross bolt 50 has a peripheral groove 50a and a flat 50b extending axially beyond one end of the bolt from the root of groove 50a. After the fastener driving and guiding means has been swung about its transverse pivot to the FIG. 4 position, the bolt 50 is inserted axially through the aligned holes 11b from left toward the right in FIG. 8 with flat 50b uppermost to provide adequate clearance for inserting the bolt. After the bolt has been inserted axially until the groove aligns with the periphery of sleeve 38, bolt 50 is rotated at least a partial turn about its longitudinal axis to the FIG. 8 position so as to move flat 50b out of alignment with the periphery of sleeve 38 slidably engaging the groove 50a so as to lock both bolt 50 and the fastener guiding and driving means in the tool frame. Groove 50a in FIG. 8 and the arcuate internal contour of the top portion of frame member 11 coact with the circular cylindrical periphery of sleeve 38 to maintain the fastener guiding and driving means in the closed position for driving, to keep the cartridge case chamber 35b firmly closed against the closure block 12, and to permit sleeve 38 to freely move axially from the ready-to-fire position in FIG. 3 to the fully driven position in FIG. 4. The placement of the pivot pins 48a and cross bolt 50 with respect to each other and the barrel axis of the tool and the breech structure is such as to provide an advantageous leverage arrangement.

Hence, the many parts of the tool are rigidly interconnected in the closed position for fastener driving. For example, tool frame member 11 has integrally formed therewith the trigger guard, hand grip and flange-like portion 11a, stop surface 11f, and lip 11d. Closure block 12, member 35, cross bolt 50 and the general framework for the manually controllable means for initiating power driving of the fastener are all rigidly connected to frame member 11 in the tool closed position for fastener driving.

After the tool has been removed from the driven fastener in a manner to be described more in detail hereinafter, the fastener guiding and driving means is moved from the tool closed position in FIG. 4 to the tool open position in FIG. 5 to eject the spent cartridge case 18 and to prepare the tool for reloading. Cross bolt 50 is removed by rotation thereof about its longitudinal axis until flat 50b is in alignment with the periphery of sleeve 38 and then is withdrawn axially from the tool. The fastener carrier C, comprising sleeve 38 and head 37, is pushed back slightly toward the breech until the front end thereof clears frame member 11 to permit swinging about pivot pins 48a down to the FIG. 5 position to open the tool by exposing the rear end of the cartridge chamber 35b. This carrier, since it is located outside bore 35a, is manually engageable by the tool operator to permit movement thereof through the full driving travel of the tool back to the initial position in FIG. 5. As this return movement takes place, the entrapped fluid in expansion chamber 54 of FIG. 4 ejects the spent cartridge case 18 from cartridge chamber 35b in the manner shown in FIG. 5 out port 11c in frame member 11 with said port being opposite to the inlet end of cartridge chamber 35b in FIG. 5 and opposite to the lower open side of frame member 11 through which the fastener guiding and driving means swings between the FIGS. 4 and 5 positions.

The tool is reloaded by screwing threaded head 15b of a fastener into the threaded bore formed by collet jaws 43 to the proper depth so as to control the depth of fastener penetration in the workpiece. Since the driving head 37 will be stopped at the same point in the tool, the extent of thread engagement will control the depth of penetration. Port 11c serves not only as an ejection port but also as a loading port to permit insertion of a new cartridge case 18 downwardly through the top of the tool. Then, the tool is swung to its closed position for driving by swinging the fastener guiding and driving means about pivots 48a until the FIG. 2 position is reached at which time lock bolt 50 is again detachably connected in its locked position to the tool.

Lip 11d on frame member 11 assures a predetermined minimum free driving travel of piercing portion 15a of the fastener before penetration of workpiece 33 since the lip extends back toward the cartridge chamber end of member 35. It is normally located beyond the distal end of head 37 and piercing portion 15a as the loaded fastener guiding and driving means is swung from the open position in FIG. 5 to the closed position in FIG. 2 when sleeve 38 is positioned on member 35, as illustrated in FIGS. 2 and 5, for maximum driving travel. However, this lip 11d interferes with this closing movement to prevent movement to the closed position unless a predetermined minimum free driving travel of piercing portion 15a exists before contact with and penetration of workpiece 33.

Adjustment or suitable control of the driving energy provided by the explosive powder in cartridge case 18 is desirable since different materials and different objects have different resistances to penetration by fastener 15, and since it is desirable to prevent constant hammering or forging of the tool frame under repeated pounding by head 37 when the frame is required to absorb excess energy not needed to fully drive fastener 15 into the workpiece 33 to the desired depth. Although variation in driving energy may be obtained by using cartridge cases of different powder loads, it is preferable to use cartridge cases of uniform load under all conditions. The next few paragraphs mention two different basic methods for controlling or adjusting this driving energy with these methods being especially useful when each cartridge case 18 has the same powder load.

Adjustment of the fastener driving energy exerted by the explosive charge in cartridge case 18 can be made before or after the tool is swung to the closed position in FIG. 2. Since the fastener driving energy is the summation of the pressure force exerted on the right-hand face of head 37 and the distance through which this force acts, any variation of one or both of these factors will affect the amount of driving energy exerted. Since each cartridge case 18 has a predetermined amount of powder therein, it will create a predetermind quantity of fluid prssure for any given volume at any given time period after the explosion. If all cartridge cases 18 have the same weight powder charge therein, each will create a fixed and equal quantity of fluid pressure. Changing the initial volume of expansion chamber 54 by moving head 37 relative to member 35 will adjust not only the amount of initial force exerted by the pressure fluid on head 37 but also the total distance through which the fluid pressure is exerted on head 37. This adjustment may be made when the fastener guiding and driving means is either in the FIG. 2 or FIG. 5 position by manually grasping sleeve 38 or head 37, both located outside the tool bore 35a, to change the initial volume of expansion chamber 54 by moving head 37 relative to member 35. A friction check ball 52 in FIG. 3, biased toward member 35 by spring 53, is carried in a radially extending hole in rear wall 40 to serve as a disengageable lock means operatively engageable with any one of annular grooves 35g on member 35 with these grooves defining at least two different volume positions with these grooves being spaced axially along the periphery of member 35 for retaining the volume adjustment desired.

If this adjustment is made with the tool in the FIG. 5 position without a cartridge case in the chamber, air can flow in or out through bore 35a in response to change in distance between flange 35d and head 37 and the amount of adjustment can be readily determined by the number of clicks caused by snapping of ball 52 into grooves 35g.

If the tool is in the FIG. 2 position, the pressure or vacuum created by the change in distance between flange 35d and head 37 will not be troublesome since leakage may be provided by a loose fluid seal fit between the end faces of member 35 and closure block 12. Notches 38a in the periphery of sleeve 38 in FIG. 3 will serve as a reference indicator coacting with the reference indicator provided by the edge of port 11c in FIGS. 1 and 3 in the closed position of the tool to be visible from outside the tool bore after the tool is loaded to indicate the amount of adjustment made.

If closed rear wall 40 is provided on sleeve 38 in the manner illustrated, an additional control of the fastener driving energy may be provided. The air or other fluid entrapped in FIG. 3 between flange 35d and rear wall 40 provides a compressible fluid cushion entrapped in this enclosure 55, separate from expansion chamber 54 and compressible in volume upon relative movement of head 37 and member 35 from the ready-to-fire position in FIG. 3 to the fully driven position in FIG. 4. The energy absorbing characteristic of this compressible fluid cushion may be controlled by vent means for said enclosure to release the compressed fluid in any predetermined manner, for example, one or more vent holes 40a may be provided in the closed rear wall 40 for controlling fluid escape from enclosure 55 at a predetermined rate to provide a dashpot action. A vent groove 35h, most clearly shown in FIG. 5, can be provided on the periphery of member 35 for controlling fluid pressure release from the enclosure at a predetermined location during the fastener driving travel, namely immediately before the fastener 15 is driven to its predetermined maximum or full depth shown in FIG. 4. One, both, or neither of these vents 40a, 35h may be used, whatever is desired. If adjustment of the cushioning action is desired, vent holes 40a may be provided with means for adjusting the orifice size or an adjustable spring loaded release valve. Orifices 40a are preferable since they vent enclosure 55 during return movement of sleeve 38 from the FIG. 4 to 5 positions during tool unloading so that the tool operator does not have to work against a vacuum in enclosure 55 and so that spring loaded ball 52 may be moved from one groove 35g to another and will retain its final adjustment without interference by the fluid pressure in enclosure 55.

If a loose fluid seal fit exists in FIG. 2 between the abutting surfaces on member 35 and closure block 12, the force exerted by the fluid pressure in chamber 54 during driving will effectively seal by a gas lock the cartridge chamber inlet against leakage; no mechanical lock, such as a conventional screw type lock is needed to close and to lock the cartridge case chamber. Since the cross sectional bore area of sleeve 38, where telescoped over flange 35d to provide the connection for permitting relative movement between the head and the member, is greater than the cross sctional area of the inlet end of the cartridge chamber 35b and since the fluid pressure throughout expansion chamber 54 is substantially equal, the fluid pressure acting rearwardly on the forward face of flange 35d will force the bore inlet end of member 35 against cartridge chamber closure block 12 to seal against leakage thereat during driving of the fastener. This force will absorb any looseness in abutment between these surfaces and will provide a gas type, gas seal lock so that a mechanical locking structure is not required.

Firing the tool by pressing trigger 25 will cause the fastener carrier and fastener 15 to move relatively slowly through the tool toward the workpiece 33, that is, relatively slowly in comparison with a conventional powder-actuated tool driving a fastener of about the same weight through its barrel bore by a powder charge of about the same weight. Here, the volume of the expansion chamber 54 is considerably larger than that behind a fastener driven through a bore of the diameter of bore 35a. Also, the weight of head 37, sleeve 38, collet 42 and fastener 15 is considerably heavier than fastener 15 per se. However, these factors, combined with the large area rear face of head 37 over which the fluid pressure may exert its force, cause the fastener and its carrier to move at a slower speed, with more force and have higher inertia. Therefore, this tool is considerably safer to use from the operational standpoint.

Figure 8:
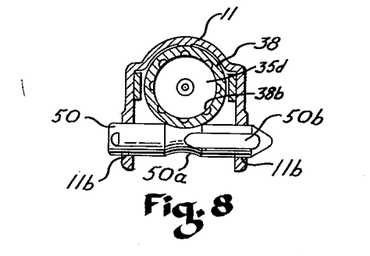
FIG. 8 is a transverse sectional view taken along the line 8—8 of FIG. 4.

During fastener driving, the fastener carrier sleeve 38 in FIG. 8 is cradled between groove 50a, semi-circular in cross section, and the downwardly facing, arcuate inner surface of frame member 11 forming a passageway along which the fastener is driven, to guide the sleeve, and to permit endwise movement thereof.

Overtravel of the fastener carrier is prevented by a stop surface 11f on frame member 11 surrounding aperture 11g in FIG. 6 through which fastener 15 is driven and engageable with head 37 for preventing driving of fastener 15 beyond its fully driven position shown in FIG. 4. Stopping could also be caused by abutment of collet chuck 42 against the surface of the workpiece, as shown in FIG. 4. Either one or both of these stopping surfaces could be used in the manner described either to control the depth of workpiece pentration by each driven fastener or to serve as a limit stop to stop overtravel of the occasional fastener that may travel beyond its normal stopping place determined by normal depth of penetration. This construction overcomes the defects of a conventional explosively actuated tool wherein the fastener is driven through the barrel at high speeds so that if the tool barrel is not properly set against the workpiece or if the fastener is fired into unsuitable material, the fastener may escape into the air in free flight so as to become a dangerous missile either continuing forward on its original path of travel or ricocheting off in another direction. Here, fastener 15 is always firmly held by the fastener carrier c throughout the full driving movement so as to accurately control penetration thereby and to prevent escape thereof into the air in free flight. In a conventional explosively actuated tool, the operator may attempt to fire the tool into the air instead of against the workpiece so as to "air fire" the tool. If air firing is attempted by the disclosed tool, there is little danger of fastener 15 breaking loose from its carrier and going forward under its own inertia at a dangerous speed since the fastener and its carrier move much more slowly than the fastener driven by the conventional explosively actuated tool and since collet springs 44 may be of sufficient size to either materially reduce or completely absorb the forward inertia of fastener 15 as it attempts to break loose from its carrier.

Immediately before head 37 engages stop surface 11f at the end of fastener driving travel, the fluid pressure in expansion chamber 54 is exhausted into the atmosphere through by-pass grooves 38b in the bore of sleeve 38, around flange 35b in the FIG. 4 position, into enclosure 55 (if rear wall 40 is used), and through vent hole 40a or along vent groove 35h (FIG. 4) through the bore of wall 40. By-pass grooves 38b are preferably not uncovered by flange 35d until immediately before head 37 engages stop surface 11f so as to get maximum fastener driving energy from the expanding explosive gases. Hence, it may be necessary to work against the fluid pressure in chamber 54 for a short distance in retracting sleeve 38 so as to clear lip 11d when moving the sleeve from the FIG. 4 to the FIG. 5 position during tool unloading. Grooves 38b could be of sufficient length to be uncovered sooner during the driving action so that they would vent chamber 54 during retraction of the sleeve to clear lip 11d if this increased length in the groove would not seriously interfere with the driving power near the end of the driving stroke.

Figure 12:
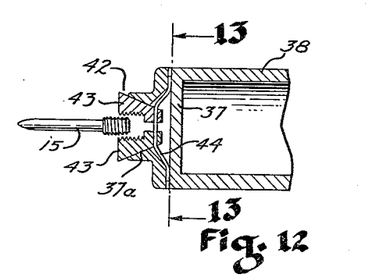
Figure 13:
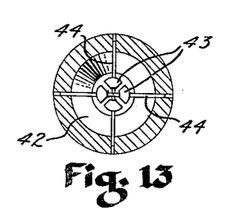
FIG. 13 is a transverse sectional view taken along the line 13—13 of FIG. 12.

This construction permits the tool to be removed from the driven fastener 15 in FIG. 4 by merely withdrawing the tool axially from the driven fastener in the manner shown in FIG. 12 so as to overcome the force of collet springs 44 and to open jaws 43 to disengage the collet chuck from the fastener. After the jaws slip off the fastener, springs 44 automatically reclose them to prepare the tool for the next fastener driving operation.

This tool is easily assembled and disassembled. To disassemble, the tool is placed in the FIG. 5 position. The laterally projecting pins 48a, 48a on ring 48 providing the barrel pivot stirrup are each located in assembled position in the lower end of the vertical leg of the aforesaid inverted L-shaped groove 11k most clearly shown in FIGS. 6 and 9a, with these pins normally held therein in assembled position by the back end of cocking slide 30 in the manner shown in FIGS. 5, 6 and 9. When the tool is in the FIG. 5 position, cocking slide 30 is movable forwardly past these grooves 11k to uncover the top of the pin retaining recesses 11h formed by the lower ends of the vertical legs of these grooves. Then, it is possible to lift these pins up from the vertical extending portions of these grooves into the horizontal extending portions thereof, rotate member 35 about its own axis to disengage pins 48a from the horizontally extending legs of these grooves 11k to move the fastener guiding and driving means toward the left and downwardly out of the tool frame in FIG. 5. Then, the tool operator may ease cocking slide 30 rearwardly slightly, squeeze the forwardly extending laterally spaced arms thereof together so as to be loosely located wholly within aperture 11g in FIG. 6, slide the arms forwardly through aperture 11g, and drop the rear end of slide 30 clear of the tool to slide it rearwardly out of the tool. If the construction of frame member 11 is altered slightly, all these movements may not be necessary. If the slots in frame member 11 through which the arms of slide 30 extend are enlarged, slide 30 may be pivoted about a horizontal axis in its forwardly extended position when uncovering pins 48a to clear the tool frame before being slid rearwardly out of the tool. If these slide arm slots are extended inward into aperture 11g, the two arms of slide 30 need only be pinched together into said aperture to provide sufficient clearance for pivoting before sliding slide 30 rearwardly out of the tool.

It should now be apparent that all of the objects specifically enumerated in the beginning of the specification as well as the other advantages described hereinbefore are found in the tool disclosed herein.

Various changes in details and arrangement of parts can be made by one skilled in the art without departing from either the spirit of this invention or the scope of the appended claims.

What we claim is:

1. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end, a head located outside the outlet end of said bore for carrying the piercing portion of a fastener during driving, means operatively connecting said head to said member outside said bore for confining fluid pressure in a chamber from said bore inlet end to behind said head and for permitting relative movement of said head with respect to said member, and a spring loaded, quickly openable collet on said head for the detachable securement of a fastener thereto during driving of the fastener and from which driven fastener the collet can be detached by axial movement of the collet relative to said fastener.

2. In a fluid pressure actuated tool for driving the piercing portions of fasteners into workpieces with each driven by a predetermined quantity of fluid pressure, the improvement in said tool comprising means for applying fluid under explosive pressure, a member having a bore therethrough for conveying said fastener driving fluid pressure from its bore inlet end, a head located outside the outlet end of said bore for carrying the piercing portion of a fastener during driving, means operatively connecting said head to said member outside said bore for confining fluid pressure in a chamber from said bore inlet end to behind said head and for permitting relative movement of said head with respect to said member, and manually adjustable means for changing the initial chamber volume for the driving fluid pressure of predetermined quantity to adjust the fastener driving energy of said head by moving the head relative to said member.

3. In a fluid pressure actuated tool for driving the piercing portions of fasteners into workpieces with each driven by a predetermined quantity of fluid pressure, the improvement in said tool comprising means for applying fluid under explosive pressure, a member having a bore therethrough for conveying said fastener driving fluid pressure from its bore inlet end, a head located outside the outlet end of said bore for carrying the piercing portion of a fastener during driving, means operatively connecting said head to said member outside said bore for confining fluid pressure in a chamber from said bore inlet end to behind said head and for permitting relative movement of said head with respect to said member, and manually adjustable means for changing the initial chamber volume for the driving fluid pressure of predetermined quantity to adjust the fastener driving energy of said head by moving the head relative to said member, said manually adjustable means including lock means adjustable into at least two different volume positions for retaining the adjustment.

4. In a fluid pressure actuated tool for driving the piercing portions of fasteners into workpieces with each driven by a predetermined quantity of fluid pressure, the improvement in said tool comprising means for applying fluid under explosive pressure, a member having a bore therethrough for conveying said fastener driving fluid pressure from its bore inlet, a head for carrying the piercing portion of a fastener during driving, means operatively connecting said head and said member for confining fluid pressure in a chamber from said bore inlet end to behind said head and for permitting relative movement of said head with respect to said member, and means manually adjustable from outside the bore after the tool is loaded for changing the initial chamber volume for the driving fluid pressure of predetermined quantity to adjust the fastener driving energy of said head by moving the head relative to said member.

5. In a fluid pressure actuated tool for driving the piercing portions of fasteners into workpieces with each driven by a predetermined quantity of fluid pressure, the improvement in said tool comprising means for applying fluid under explosive pressure, a member having a bore therethrough for conveying said fastener driving fluid pressure from its bore inlet end, a closure element operatively connected to said member for relative movement between an inlet open position for loading into the inlet of said bore and an inlet closed position for fastener driving, a head for carrying the piercing portion of a fastener during driving, means operatively connecting said head and said member for confining fluid pressure in a chamber in said bore and behind said head and for permitting relative movement of said head with respect to said member, and means manually adjustable from outside the bore after the tool is loaded and the inlet end closed for changing the initial chamber volume for the driving fluid pressure of predetermined quantity to adjust the fastener driving energy of said head by moving the head relative to said member with a loose fluid seal fit existing at the inlet end of said bore between said member and element to permit fluid escape for permitting movement of said head.

6. In a fluid pressure actuated tool for driving the piercing portions of fasteners into workpieces with each driven by a predetermined quantity of fluid pressure, the improvement in said tool comprising means for applying fluid under explosive pressure, a member having a bore therethrough for conveying said fastener driving fluid pressure from its bore inlet end, a head for carrying the piercing portion of a fastener during driving, means operatively connecting said head and said member for confining fluid pressure in a chamber from said bore inlet end to behind said head and for permitting relative movement of said head with respect to said member, and means manually adjustable from outside the bore after the tool is loaded for changing the initial chamber volume for the driving fluid pressure of predetermined quantity to adjust the fastener driving energy of said head by moving the head relative to said member, said manually adjustable means including coacting reference indicators fixed in fastener driving position relative to said head and to said member respectively to be visible from outside the bore.

7. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end and having an outwardly extending flange, and a carrier having a head larger than said bore and located outside the outlet end of said bore for carrying the piercing portion of a fastener during driving, said carrier including a sleeve having its lead end closed by said head and being telescopically connected over said flange near said outlet end for confining fluid pressure in a chamber from said bore inlet end to behind said head and for permitting relative movement of said head with respect to said member, said sleeve having a rear wall located behind said flange telescopically movable over the periphery of said member to guide the travel of said head.

8. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end, a head located outside the outlet end of said bore for carrying the piercing portion of a fastener during driving, means operatively connecting said head to said member outside said bore for confining fluid pressure in a chamber from said bore inlet end to behind said head and for permitting relative movement of said head with respect to said member, means forming an enclosure separate from said chamber and operatively connected to said member and head and variable in volume upon relative movement of said head and member, and vent means for controlling fluid pressure within said enclosure in a predetermined manner during fastener driving travel for controlling the fastener driving force.

9. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end and having an outwardly extending flange, and a carrier having a head located outside the outlet end of said bore for carrying the piercing portion of a fastener during driving, said carrier including a sleeve having its lead end closed by said head and being telescopically connected over said flange near said outlet end for confining fluid pressure in a chamber from said bore inlet end to behind said head and for permitting relative movement of said head with respect to said member, said sleeve having a closed rear wall telescopically movable over the periphery of said member to guide the travel of said head and located behind said flange to form an enclosure variable in volume upon relative movement of said head and member, said rear wall having a vent groove hole for controlling fluid pressure escape from said enclosure at a predetermined rate during fastener driving travel.

10. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end and having an outwardly extending flange, and a carrier having a head located outside the outlet end of said bore for carrying the piercing portion of a fastener during driving, said carrier including a sleeve having its lead end closed by said head and being telescopically connected over said flange near said outlet end for confining fluid pressure in a chamber from said bore inlet end to behind said head and for permitting relative movement of said head with respect to said member, said sleeve having a closed rear wall telescopically movable over the periphery of said member to guide the travel of said head and located behind said flange to form an enclosure variable in volume upon relative movement of said head and member, a portion of the periphery of said member having a vent groove coacting with the closed rear wall of said sleeve for controlling fluid pressure escape from said enclosure in a predetermined manner at a predetermined rate and location during the fastener driving travel.

11. In a fluid pressure actuated tool for driving the piercing portions of fasteners into workpieces with each driven by a predetermined quantity of fluid pressure, the improvement in said tool comprising means for applying fluid under explosive pressure, a member having a bore therethrough for conveying said fastener driving fluid pressure from its bore inlet end and having an outwardly extending flange, a carrier having a head located outside the outlet end of said bore for carrying the piercing portion of a fastener during driving, said carrier including a sleeve having its lead end closed by said head and being telescopically connected over said flange near said outlet end for confining fluid pressure in a chamber from said bore inlet end to behind said head and for permitting relative movement of said head with respect to said member, said sleeve being manually adjustable from outside the bore after the tool is loaded for changing the initial chamber volume for the driving fluid pressure of predetermined quantity to adjust the fastener driving energy of said head by moving the head relative to said member, said sleeve having a closed rear wall telescopically movable over the periphery of said member to guide the travel of said head and located behind said flange to form an enclosure variable in volume upon relative movement of said head and member, lock means carried by said rear wall and operatively and selectively engageable with said member in at least two different volume positions for retaining the adjustment, and vent means on said enclosure for controlling fluid pressure escape from said enclosure in a predetermined manner during fastener driving travel.

12. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end, a head located outside the outlet end of said bore for carrying the piercing portion of a fastener during driving, means operatively connecting said head to said member outside said bore for confining fluid pressure in a chamber from said bore inlet end to behind said head and for permitting relative movement of said head with respect to said member, and vent means for exhausting said chamber at the end of fastener driving travel.

13. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end, a carrier having a head located outside the outlet end of said bore for carrying the piercing portion of a fastener during driving and a cylinder operatively connecting said head to said member outside said bore for confining fluid pressure in a chamber from said bore inlet end to behind said head and for permitting relative movement of said head with respect to said member, the bore of said cylinder having vent grooves for exhausting said chamber at the end of fastener driving travel, and stop means rigidly connected to said member and operatively engageable by said head in the fully driven position of said fastener for preventing overtravel thereof.

14. The improvement of claim 16, including a movable cross bolt detachably extending through aligned holes in opposite sides of said frame straddling said open side to detachably lock the driving and guiding means in said first position, said bolt being removable from said holes to allow said means to be moved to said second position, said cross bolt having a peripheral groove for retaining in said frame said driving and guiding means in said first position for driving by engagement with the periphery thereof and having a flat extending axially beyond one end of said bolt from the root of said groove to provide adequate clearance for inserting said bolt in both said aligned frame holes and then to permit at least partial rotation of said bolt about its longitudinal axis to move said flat out of alignment and to lock both said lock bolt and said guiding and driving means in said frame by said groove.

15. In an explosively actuated tool for driving the piercing portions of fasteners into workpieces, the improvement in said tool comprising means for applying fluid under explosive pressure, a member having a bore therethrough for conveying said fastener driving explosive fluid pressure from an explosive charge cartridge case locatable in a cartridge chamber at the bore inlet end, a chamber closure element, means operatively connecting said member and said element for relative movement between a chamber open position for cartridge case loading and ejection and a chamber closed position for firing, a head located outside the outlet end of said bore for carrying the piercing portion of a fastener during driving, means operatively connecting said head to said member outside said bore for confining fluid pressure in an expansion chamber from said bore inlet end to behind said head and for permitting relative movement of said head with respect to said member from an initial to a final position for fastener driving, and manually engageable means for moving said head and located outside the bore through the full travel movement of said head when the tool is adapted to be unloaded with the chamber closure element in the chamber open position, whereby moving said manually engageable means to move said head back to said initial position will cause the entrapped fluid in said chamber to eject the spent cartridge case from said cartridge chamber.

16. In a fluid pressure actuated tool for driving the piercing portions of fasteners into workpieces, the improvement in said tool comprising means for applying fluid under explosive pressure, a member having a bore therethrough for conveying said fastener driving fluid presure from the bore inlet end, a closure element, means operatively connecting said closure element to said member for relative movement between an inlet end open position for loading and an inlet end closed position for fastener driving, a head for carrying the piercing portion of a fastener during driving, and means operatively connecting said head and said member for confining fluid pressure in an expansion chamber from said bore inlet end to behind said head and for permitting relative movement of said head with respect to said member, said closure element being loosely engageable with said member in said closed position, the cross sectional bore area of the connection for confinement and permitting relative movement between said head and member being greater than that of the inlet end so that the fluid pressure in said expansion chamber will force the bore inlet end of said member against said closure element to seal against leakage thereat during driving of the fastener.

17. In an explosively actuated tool for driving the piercing portions of fasteners into workpieces, the improvement in said tool comprising means for applying fluid under explosive pressure, a member having a bore therethrough for conveying said fastener driving explosive fluid pressure from an explosive charge cartridge case locatable in a cartridge chamber at the bore inlet end, a chamber closure element, means pivotally connecting together said element and said member on an axis located to one side of said bore and extending transversely thereto, said closure element and said member being relatively movable between a chamber open position for cartridge case loading and a chamber closed position for firing, a carrier including a head located outside the outlet end of said bore for carrying the piercing portion of a fastener during driving and including a sleeve having its lead end closed by said head and being telescopically connected to the outside of said member for confining fluid pressure in an expansion chamber from said bore inlet end to behind said head and for permitting relative movement of said head with respect to said member, said cartridge chamber closure element and said member being loosely engageable in cartridge chamber closed position, the cross sectional area of the connection for confinement and permitting relative movement between said head and member being greater than that of the inlet end cartridge chamber so that the fluid pressure in said expansion chamber will force the inlet end of said member against said cartridge chamber closure element to seal against leakage thereat.

18. In a power actuated tool for driving the piercing portions of fasteners into workpieces, the improvement in said tool comprising means for applying fluid under explosive pressure, a fastener guiding and driving means including a member having a bore therethrough with inlet and outlet ends for conveying said fluid with said bore extending in the direction of fastener driving travel, an inlet end closure element, manually controllable means for initiating power driving of said fastener, a solid tool frame having rigidly connected thereto said inlet end closure element and said manually controllable means, and means pivotally connecting said member and frame for relative movement between a closed position for driving with said closure element closing said inlet end and an open position for loading with said inlet end uncovered, said frame having a surface for contacting the workpiece during fastener driving in the zone of fastener penetration.

19. In an explosively actuated tool for driving the piercing portions of fasteners into workpieces, the improvement in said tool comprising means for applying fluid under explosive pressure, a fastener guiding and driving means including a member having a bore therethrough for conveying said explosive fastener driving fluid pressure with inlet and outlet ends and having a cartridge case chamber at said inlet end, an inlet end closure element, manually controllable firing means for initiating power driving of said fastener, a solid tool frame having rigidly connected thereto said inlet end closure element and said manually controllable firing means, and means pivotally connecting said member and frame for relative movement between a closed position for driving with said closure element closing said inlet end and an open position for loading with said inlet end uncovered, said frame having a surface for contacting the workpiece during fastener driving in the zone of fastener penetration.

20. In an explosively actuated tool for driving the piercing portions of fasteners into workpieces, the improvement in said tool comprising means for applying fluid under explosive pressure, a fastener guiding and driving means including a member having a bore therethrough for conveying said fastener driving explosive fluid pressure with inlet and outlet ends and having a cartridge case chamber at said inlet end, an inlet end closure element, manually controllable firing means for initiating power driving of said fastener, a solid tool frame having rigidly connected thereto said inlet end closure element and said manually controllable firing means, and means pivotally connecting said member and frame for relative movement between a closed position for driving with said closure element closing said inlet end and an open position for loading with said inlet end uncovered, said frame being open on one side through which said guiding and driving means swings in moving from closed to open positions and having a loading and ejection port opposite to said one side and to the inlet end in the open position.

21. In a power actuated tool for driving the piercing portions of fasteners into workpieces, the improvement in said tool comprising means for applying fluid under explosive pressure, a fastener guiding and driving means including a member having a bore therethrough with inlet and outlet ends for conveying said fluid with said bore extending in the direction of fastener driving travel, manually controllable means for initiating power driving of said fastener, a tool frame, and means operatively connecting said member and frame for relative movement between a first position for driving and a second position for loading, said frame having a lip extending toward said inlet end and located normally beyond the distal end of said guiding and driving means and said piercing portion during their movement between said second and first positions when positioned for maximum driving travel but to interfere therewith to prevent movement to the first position when extended a predetermined length toward the fully driven position so as to assure a predetermined minimum free driving travel of said piercing portion before penetration of the workpiece.

22. In a power actuated tool for driving the piercing portions of fasteners into workpieces, the improvement in said tool comprising means for applying fluid under explosive pressure, a fastener guiding and driving means including a member having a bore therethrough with inlet and outlet ends for conveying said fluid with said bore extending in the direction of fastener driving travel and including a head for carrying the piercing portion of a fastener during driving with said head operatively connected to said member for relative movement by power along the axis of said bore, a tool frame, manually controllable means on said frame for initiating power driving of said fastener, means pivotally connecting said member and frame for relative movement between a first position for driving and a second position for loading, a stop means on said frame engageable with said head for preventing driving travel of said fastener beyond a predetermined distance, and means for permitting tool removal from said fastener after stopping of said fastener travel.

23. In a power actuated tool for driving the piercing portions of fasteners into workpieces, the improvement in said tool comprising means for applying fluid under explosive pressure, a fastener guiding and driving means including a member having a bore therethrough extending in the direction of fastener driving travel for conveying said fluid, manually controllable means for initiating power driving of said fastener responsive to operator controlled movement, a tool frame, and means operatively connecting said manually controllable means to said frame, said member and frame being pivotally connected for relative movement between a first position for driving and a second position for loading, said pivotal mounting including a pivot pin projecting from said member located in a recess in said frame and including a member of said manually controllable means locking said pin in said recess when said member is in said first position.

24. In a power actuated tool for driving the piercing portions of fasteners into workpieces, the improvement in said tool comprising means for applying fluid under explosive pressure, a fastener guiding and driving means including a member having a bore therethrough extending in the direction of fastener driving travel for conveying said fluid, manually controllable means for initiating power driving of said fastener responsive to operator controlled movement, and a tool frame operatively connected to said manually controllable means, said member and frame being pivotally connected for relative movement between a first position for driving and a second position for loading, said pivotal mounting including a pivot pin projecting from said member located in a recess in said frame and including a movable member of said manually controllable means locking said pin in said recess when said member is in said first position but movable to a pivot released recess uncovered position, to permit disassembly of said member and frame when pivoted out of said first position.

25. In a fluid pressure actuated tool for driving the piercing portions of fasteners into workpieces, the improvement in said tool comprising means for applying fluid under explosive pressure, a member having a bore therethrough for conveying said fastener driving fluid pressure from its bore inlet end, a carrier having a head located outside the outlet end of said bore for carrying the piercing portion of a fastener during driving and having a sleeve with its lead end closed by said head, and means providing an annular telescopic guiding connection between said member and sleeve for confining fluid pressure in a chamber from said bore inlet end to behind said head, for permitting relative movement of said head with respect to said member and for providing the sole annular guide for said sleeve during said relative movement.

26. In an explosively actuated tool for driving, an impact piston assembly comprising means for applying fluid under explosive pressure, a cylinder member having a side wall forming a cylinder bore, a closed end for said bore and an opposite end of said bore having an opening smaller than said bore and communicating therewith, a piston member passing through said opening with a reduced part extending out of said opening and an enlarged part extending therein to divide said cylinder bore into two chambers, means on one of said members for carrying an impacting element during driving, said members being in relatively moveable relationship to adapt said assembly for extension to provide an impact stroke, one of said members having a passage therethrough for conveying said fluid from said applying means to one of said chambers to extend said assembly, vent means adjacent said opposite end for exhausting at least the other chamber formed by said piston member and opposite end, and stop means connected to one of said members and operatively engageable by said other member in the fully extended position of said members, the interior of said side wall being formed with at least one groove of reduced length and displaced position relative to the length and opposite end of said cylinder member respectively, so that when said assembly approaches full extension, said groove spans said enlarged part to provide communication between said chambers at the termination of the impact stroke whereby part of said conveying fluid is bled off through said other chamber and vent means so that engagement of said stop means and other member is cushioned at said termination.

References Cited in the file of this patent

UNITED STATES PATENTS

| | | |
|---|---|---|
| 351,310 | Clark | Oct. 19, 1886 |
| 920,720 | Bowen | May 4, 1909 |
| 1,569,153 | Temple | Jan. 12, 1926 |
| 2,221,157 | Temple | Nov. 12, 1940 |
| 2,256,028 | Jardine | Sept. 16, 1941 |
| 2,669,716 | Catlin | Feb. 23, 1954 |
| 2,719,300 | Walker | Oct. 4, 1955 |

FOREIGN PATENTS

| | | |
|---|---|---|
| 6,491 | Great Britain | of 1914 |
| 211,001 | Great Britain | Feb. 14, 1924 |